(12) United States Patent
Guterman et al.

(10) Patent No.: US 9,154,972 B2
(45) Date of Patent: Oct. 6, 2015

(54) METHODS AND APPARATUS FOR TESTING ELECTRONIC DEVICES WITH ANTENNA ARRAYS

(71) Applicant: Apple Inc., Cupertino, CA (US)

(72) Inventors: Jerzy Guterman, Mountain View, CA (US); Joshua G. Nickel, San Jose, CA (US); Boon W. Shiu, San Jose, CA (US); Mattia Pascolini, Campbell, CA (US)

(73) Assignee: Apple Inc., Cupertino, CA (US)

( * ) Notice: Subject to any disclaimer, the term of this patent is extended or adjusted under 35 U.S.C. 154(b) by 297 days.

(21) Appl. No.: 13/916,090

(22) Filed: Jun. 12, 2013

(65) Prior Publication Data

US 2014/0370821 A1    Dec. 18, 2014

(51) Int. Cl.
    *H04W 24/00* (2009.01)
(52) U.S. Cl.
    CPC ..................... *H04W 24/00* (2013.01)
(58) Field of Classification Search
    CPC ............ H04B 17/0085; H04B 17/002; H04B 17/0025; H04B 17/29; H04W 24/00
    USPC .......... 455/67.14, 67.11, 67.12, 115.1, 115.2, 455/226.1; 324/750.16, 756.04, 750.19
    See application file for complete search history.

(56) References Cited

U.S. PATENT DOCUMENTS

| | | | | |
|---|---|---|---|---|
| 4,866,375 A | * | 9/1989 | Malloy | 324/750.19 |
| 5,001,422 A | * | 3/1991 | Dahlberg et al. | 324/756.05 |
| 5,032,789 A | * | 7/1991 | Firooz et al. | 324/750.03 |
| 5,104,277 A | * | 4/1992 | Bullock | 414/280 |
| 5,214,374 A | * | 5/1993 | St. Onge | 324/754.15 |
| 5,270,641 A | * | 12/1993 | Van Loan et al. | 324/754.11 |
| 5,347,159 A | * | 9/1994 | Khandros et al. | 257/692 |
| 6,005,405 A | * | 12/1999 | Slutz | 324/754.08 |
| 6,348,805 B1 | * | 2/2002 | Jackson et al. | 324/750.16 |
| 6,535,004 B2 | * | 3/2003 | Mehta et al. | 324/750.24 |
| 6,590,409 B1 | * | 7/2003 | Hsiung et al. | 324/754.22 |
| 6,759,860 B1 | * | 7/2004 | Hsiung et al. | 324/750.19 |
| 7,035,594 B2 | | 4/2006 | Wallace et al. | |
| 7,116,120 B1 | * | 10/2006 | Cannon | 324/756.04 |

(Continued)

FOREIGN PATENT DOCUMENTS

WO    2012107782    8/2012

OTHER PUBLICATIONS

Shiu et al., U.S. Appl. No. 13/780,787, filed Feb. 28, 2013.

*Primary Examiner* — Minh D Dao
(74) *Attorney, Agent, or Firm* — Treyz Law Group; Jason Tsai

(57) ABSTRACT

A wireless electronic device may be provided with antenna structures. The antenna structures may be formed from an antenna ground and an array of antenna resonating elements formed along its periphery. The antenna resonating elements may be formed from metal traces on a dielectric support structure that surrounds the antenna ground. The electronic device may be tested using a test system for detecting the presence of manufacturing/assembly defects. The test system may include an RF tester and a test fixture. The device under test (DUT) may be attached to the test fixture during testing. Multiple test probes arranged along the periphery of the DUT may be used to transmit and receive RF test signals for gathering scattering parameter measurements on the device under test. The scattering parameter measurements may then be compared to predetermined threshold values to determine whether the DUT contains any defects.

20 Claims, 12 Drawing Sheets

(56) References Cited

U.S. PATENT DOCUMENTS

| | | |
|---|---|---|
| 7,340,218 B2 | 3/2008 | Shoulders et al. |
| 7,915,909 B2 | 3/2011 | Dunn et al. |
| 8,326,229 B2 | 12/2012 | Foegelle |
| 2005/0212541 A1* | 9/2005 | Ruff et al. ............... 324/761 |
| 2012/0268153 A1* | 10/2012 | Nickel et al. ............ 324/754.31 |
| 2013/0002280 A1* | 1/2013 | Nickel et al. ............ 324/750.16 |
| 2014/0091972 A1* | 4/2014 | Hoang et al. ............ 343/703 |

* cited by examiner

METHODS AND APPARATUS FOR TESTING ELECTRONIC DEVICES WITH ANTENNA ARRAYS

BACKGROUND

This relates to wireless electronic devices and, more particularly, to testing electronic devices with wireless communications circuitry.

Electronic devices such as computers, media players, cellular telephones, wireless base stations, and other electronic devices often contain radio-frequency communications circuitry. For example, cellular telephone transceiver circuitry or wireless local area network circuitry may be used to allow a device to wirelessly communicate with external equipment. Antenna structures in the radio-frequency circuitry may be used in transmitting and receiving wireless signals.

The antenna performance of an electronic device may depend on how accurately the radio-frequency communications circuitry is manufactured and assembled within the electronic device. Manufacturing defects present in radio-frequency circuits (i.e., defects due to process variation and non-ideal fabrication environments) may have a negative impact on device performance. For example, if defective parts are assembled in a finished device, the finished device may exhibit unsatisfactory wireless performance during production testing. Detection of faults only after assembly is complete results in costly device scrapping or extensive reworking.

Mishandling during device assembly operations can also have a detrimental impact on device performance. During device assembly, workers and automated assembly machines may be used to connect connectors for antennas and other components to mating connectors, form welds, machine features into conductive device structures, and otherwise form and interconnect electronic device structures. If care is not taken, however, faults may result that can impact the performance of a final assembled device. For example, a connector may not be seated properly within its mating connector or a metal part may not be machined correctly. In some situations, it can be difficult or impossible to detect and identify these faults, if at all, until assembly is complete and a finished device is available for testing. Detection of faults only after assembly is complete can results in costly device scrapping or extensive reworking.

It would therefore be desirable to be able to provide improved ways in which to detect faults during the manufacturing of electronic devices.

SUMMARY

An electronic device may contain storage and processing circuitry and input-output circuitry such as wireless communications circuitry. The wireless communications circuitry may include a radio-frequency transceiver coupled to antenna structures. The radio-frequency transceiver circuitry may support communications in communications bands such as cellular telephone communications bands and wireless local area network bands.

The antenna structures may be formed from an antenna ground and an array of antenna resonating elements that share the antenna ground. The electronic device may have a periphery and there may be, for example, six antenna resonating elements that forms an array of six respective antennas around the periphery of the electronic device. The electric field polarizations of at least some of the antennas may be different. Providing the antenna array with polarization diversity may enhance antenna performance.

A radio-frequency test system is provided that can be used for testing an electronic device of the type that includes antenna structures formed along its periphery. The electronic device under test (DUT) may only be partially assembled and may be powered off during testing. The test system may include a test host (e.g., a personal computer), a test unit (e.g., a vector network analyzer) for generating radio-frequency test signals, and a test fixture for receiving the DUT during testing.

A non-conductive region may be formed on the test fixture. Antenna test probes may be formed in the non-conductive region. The DUT may be mounted over the non-conductive region during testing. In one arrangement, the DUT may be inserted in a recess in the test fixture in an upside-down orientation that is different than the upright position in which the DUT is oriented during normal operation. While the DUT is mounted on the test fixture, a portion of the non-conductive portion that is arranged along the periphery of the DUT may serve as a test waveguide structure though which radio-frequency test signals can travel around the periphery of the DUT. There may, as an example, be four antenna test probes placed near the corners of the DUT, where a first pair of antenna test probes has a first size and where a second pair of antenna test probes has a second size that is different than the first size.

The test unit may be used to transmit and receive corresponding wireless test signals that have propagated through at least a portion of the test waveguide structure. Test data such as scattering parameter measurements may then be obtained based on the transmitted and received test signals. The test host may then be used to determine whether the partially assembled DUT contains any manufacturing defects by comparing the scattering parameter measurements to predetermined (calibrated) baseline data.

Further features of the present invention, its nature and various advantages will be more apparent from the accompanying drawings and the following detailed description.

DETAILED DESCRIPTION

Figure 1:
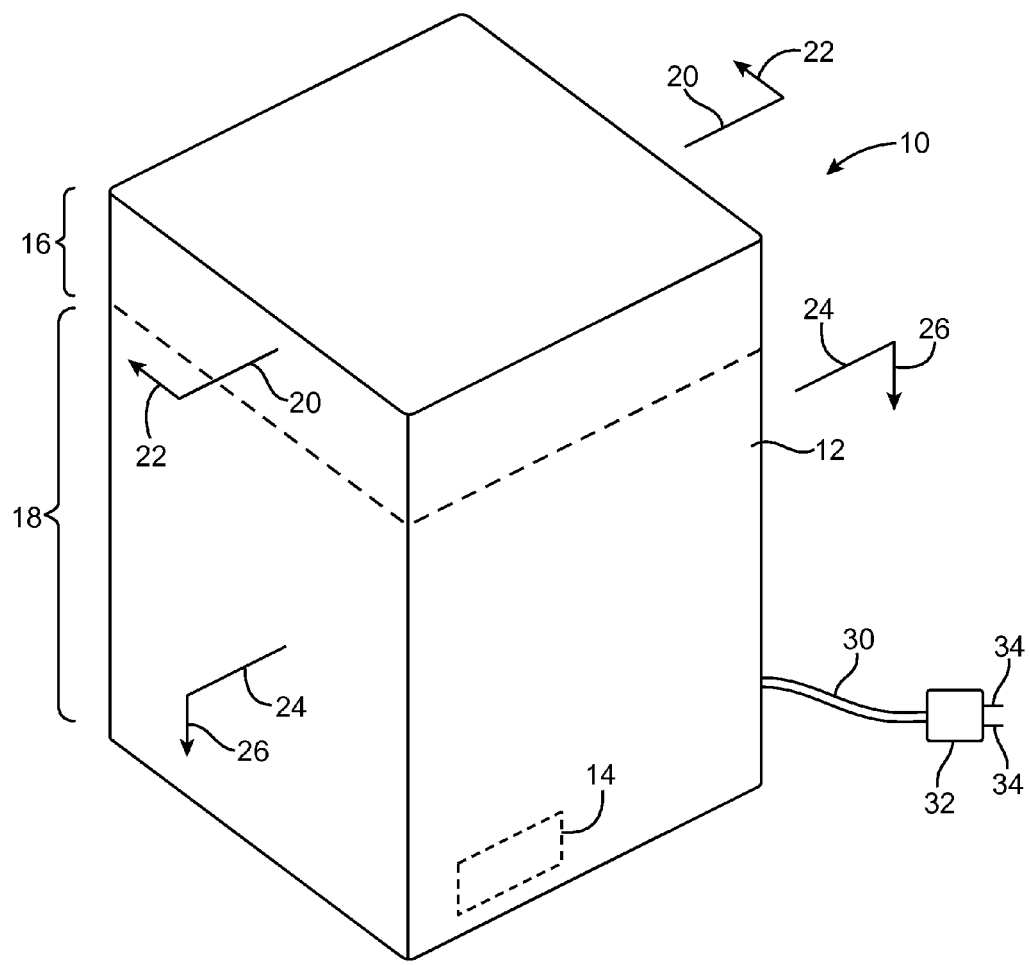
FIG. 1 is a perspective view of an illustrative electronic device containing wireless circuitry in accordance with an embodiment of the present invention.

Wireless electronic devices such as wireless electronic device 10 of FIG. 1 may contain wireless circuitry. The wireless circuitry of wireless electronic device 10 may include radio-frequency transceiver circuitry and associated antenna structures for transmitting and receiving wireless signals. Electronic device 10 may be a handheld electronic device such as a portable media player or cellular telephone, may be a portable computer such as a tablet computer or laptop computer, may be a desktop computer, may be a television, may be a wireless access point or other wireless base station, may be a computer monitor, may be a set-top box, may be a gaming console, or may be other electronic equipment. Illustrative configurations in which wireless electronic device 10 is a wireless base station such as a wireless base station that serves as a wireless access point for a wireless local area network and that may be provided with a hard drive or other mass storage device are sometimes described herein as an example.

As shown in FIG. 1, electronic device 10 may have a housing such as housing 12. Housing 12 may be formed from one or more housing structures. Housing 12 may include metal structures, plastic structures, glass structures, ceramic structures, and structures formed from other materials. Housing 12 may, if desired, be formed using a unibody construction in which housing 12 or substantially all of housing 12 is formed from a single machined piece of material. Housing 12 may also be formed by joining two or more parts (e.g., first and second housing members, internal housing frame structures, etc.). To allow antennas to operate satisfactorily, the walls of housing 12 may be formed from a dielectric such as plastic or one or more dielectric antenna window structures may be formed in a conductive housing 12. As an example, the top and four sides of housing 12 may be formed form plastic.

Device 10 may include antenna structures and additional electrical components. The antenna structures may be located in an upper portion of housing 12 such as upper portion 16. The antenna structures may include one or more antennas that are used to wirelessly transmit and receive signals for device 10. Antenna structures in device 10 may, for example, include multiple antennas organized to form a multiple antenna array. The antenna array may be used for implementing wireless communications schemes such as MIMO (multiple input multiple output) schemes.

The additional electrical components may be located in a lower portion of housing 12 such as lower portion 18. Device 10 may be coupled to a source of alternating current line power or a source of direct current power. For example, device 10 may receive alternating current power through electrical cord 30 and plug 32. Plug 32 may have prongs 34 that fit into a wall outlet.

Device 10 may include data ports, buttons, and other components. Such components may be mounted in a region of device 10 such as region 14 of FIG. 1. Buttons may be used for turning on and off device 10, for making settings adjustments when using device 10, and for otherwise facilitating user interactions with device 10. Openings may be formed in the housing wall of device 10 in region 14 of housing 12 or other suitable region to accommodate ports such as audio jacks, digital data ports, etc. Status indicator lights and other input-output devices may also be incorporated in device 10 in a region such as region 14, if desired.

Figure 2:
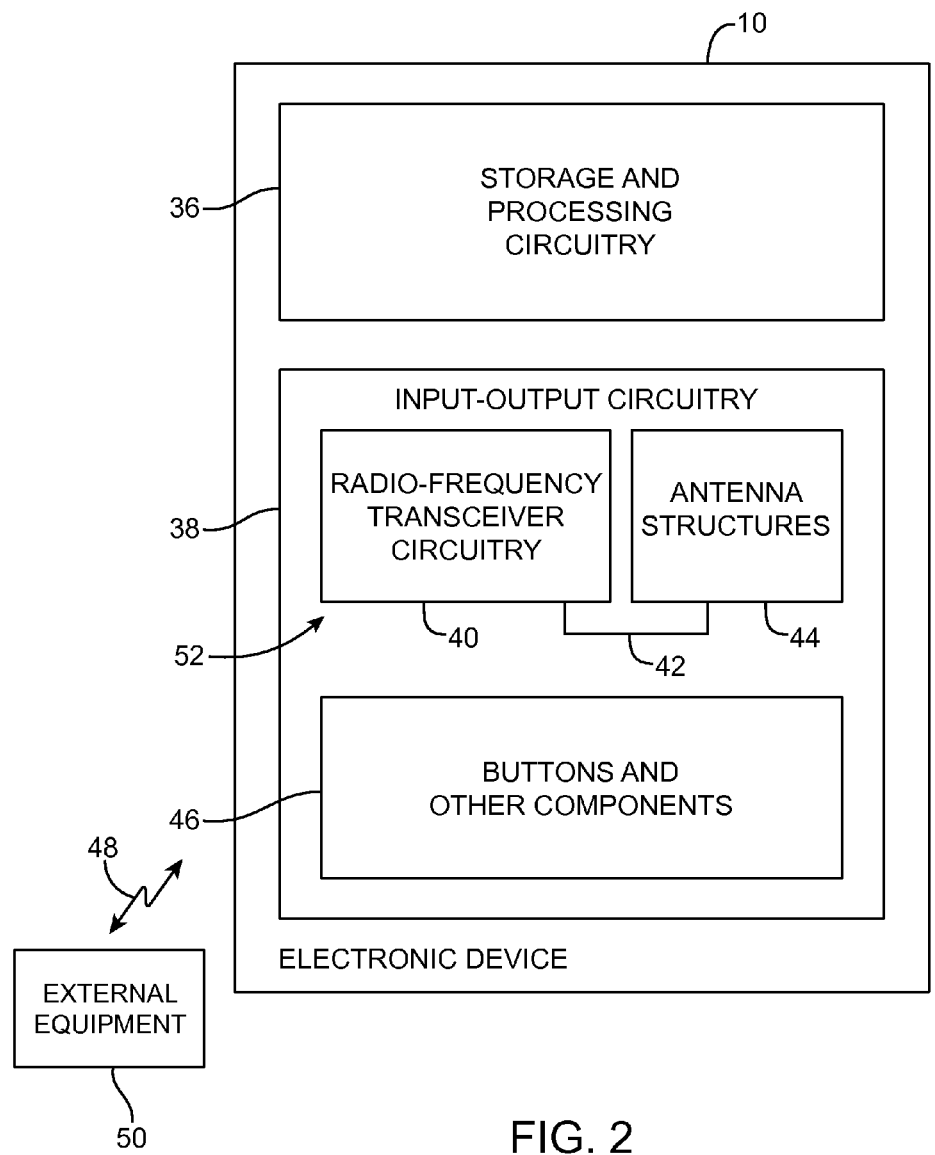
FIG. 2 is a schematic diagram of an illustrative electronic device containing wireless circuitry and associated external equipment that may wirelessly communicate with the electronic device over a wireless communications path in accordance with an embodiment of the present invention.

FIG. 2 is a schematic diagram showing illustrative components that may be included in an electronic device such as electronic device 10 of FIG. 1. As shown in FIG. 2, electronic device 10 may include control circuitry such as storage and processing circuitry 36 and may include associated input-output circuitry 38.

Control circuitry 36 may include storage and processing circuitry that is configured to execute software that controls the operation of device 10. Control circuitry 36 may include microprocessor circuitry, digital signal processor circuitry, microcontroller circuitry, application-specific integrated circuits, and other processing circuitry. Control circuitry 36 may also include storage such as volatile and non-volatile memory, hard-disk storage, removable storage, solid state drives, random-access memory, memory that is formed as part of other integrated circuits such as memory in a processing circuit, etc.

Input-output circuitry 38 may include components for receiving input from external equipment and for supplying output. For example, input-output circuitry 38 may include user interface components for providing a user of device 10 with output and for gathering input from a user. As shown in FIG. 2, input-output circuitry 38 may include wireless circuitry 52. Wireless circuitry 52 may be used for transmitting and/or receiving signals in one or more communications bands such as cellular telephone bands, wireless local area network bands (e.g., the 2.4 GHz and 5 GHz IEEE 802.11 bands), satellite navigation system bands, etc. For example, when device 10 is used as a wireless base station, wireless circuitry 52 may support 2.4 GHz and 5 GHz IEEE 802.11 wireless local area network communications.

Wireless circuitry 52 may include transceiver circuitry such as radio-frequency transceiver 40. Radio-frequency transceiver 40 may include a radio-frequency receiver and/or a radio-frequency transmitter. Radio-frequency transceiver circuitry 40 may be used to handle wireless signals in communications bands such as the 2.4 GHz and 5 GHz WiFi® bands, cellular telephone bands, and other wireless communications frequencies of interest.

Radio-frequency transceiver circuitry 40 may be coupled to one or more antennas in antenna structures 44 using transmission line structures such as transmission lines 42. Transmission lines 42 may include coaxial cables, microstrip transmission lines, transmission lines formed from traces on flexible printed circuits (e.g., printed circuits formed from flexible sheets of polyimide or other layers of flexible polymer), transmission lines formed from traces on rigid printed circuit boards (e.g., fiberglass-filled epoxy substrates such as FR4 boards), or other transmission line structures. If desired, circuitry may be interposed within transmission line structures 42 such as impedance matching circuitry, filter circuitry, switches, and other circuits. This circuitry may be implemented using one or more components such as integrated circuits, discrete components (e.g., capacitors, inductors, and resistors), surface mount technology (SMT) components, or other electrical components.

Antenna structures 44 may include inverted-F antennas, patch antennas, loop antennas, monopoles, dipoles, or other suitable antennas. Configurations in which at least one antenna in device 10 is formed from an inverted-F antenna structure are sometimes described herein as an example. Wireless circuitry 52 may use antenna structures 44 to transmit and receive wireless signals such as wireless signals 48, thereby allowing device 10 to communicate with external equipment 50. External equipment 50 may be a handheld electronic device such as a portable media player or cellular telephone, may be a portable computer such as a tablet computer or laptop computer, may be a desktop computer, may be a television, may be a wireless access point or other wireless base station, may be a computer monitor, may be a set-top box, may be a gaming console, or may be other electronic equipment. For example, if electronic device 10 has been configured to serve as a wireless base station, external equipment 50 may be one or more tablet computers, cellular telephones, portable computers, desktop computers, media player equipment, and other equipment that communicates with the wireless base station using wireless signals 48.

Input-output circuitry 38 may include buttons and other components 46. Components 46 may include buttons such as sliding switches, push buttons, menu buttons, buttons based on dome switches, keys on a keypad or keyboard, or other switch-based structures. Components 46 may also include sensors, displays, speakers, microphones, cameras, status indicators lights, etc.

Figure 3:
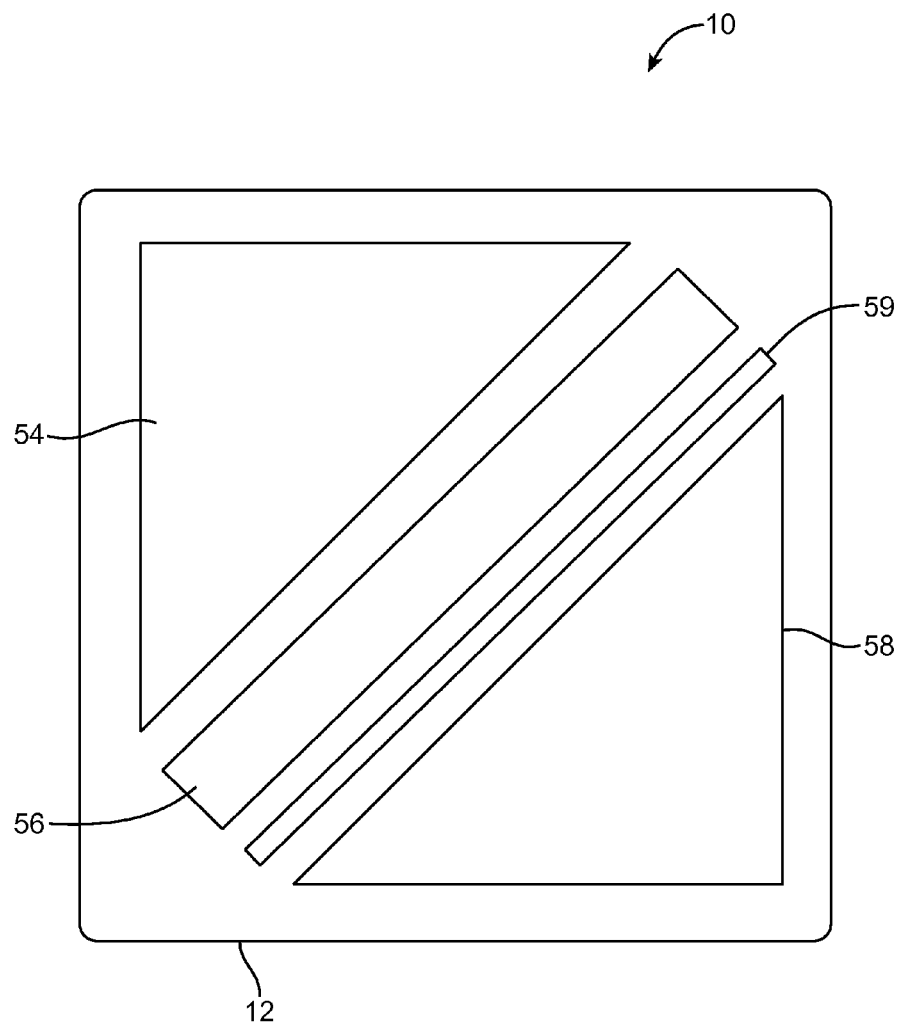
FIG. 3 is a cross-sectional top view of an illustrative electronic device of the type shown in FIG. 1 in accordance with an embodiment of the present invention.

A cross-sectional top view of device 10 of FIG. 1 taken along line 24 and viewed in direction 26 of FIG. 1 is shown in FIG. 3. As shown in FIG. 3, housing 12 may have a rectangular outline. Storage such as a hard drive, a solid state drive, or other mass storage device may be mounted within diagonal region 56. The mass storage device may be used to store large amounts of data (e.g., more than 256 GB, more than 1 TB, etc.). Region 58 may contain power supply circuitry, a fan, control circuitry 36 and input-output circuitry 38 of FIG. 2, and other electrical components. Region 54 may contain a heat sink. For example, metal heat sink fins that are used in cooling the hard drive or other storage of region 56 and/or the circuitry of region 58 may be installed in region 54.

Device 10 may also contain printed circuit board 59. Components such as integrated circuits, connectors, switches, application specific integrated circuits, processors, control circuitry (e.g., storage and processing circuitry 36), input-output components such as circuitry 46, communications circuits (e.g., wired communications circuits and wireless communications circuitry 52), and other circuitry for supporting the operation of device 10 may, for example, be mounted no board 59. As illustrated in FIG. 3, board 59 (sometimes referred to as a main logic board) may be mounted between region 56 and region 58. Arranged in this way, heat sink structures in region 58 may be attached to one or more components on board 59 to cool those components.

Figure 4:
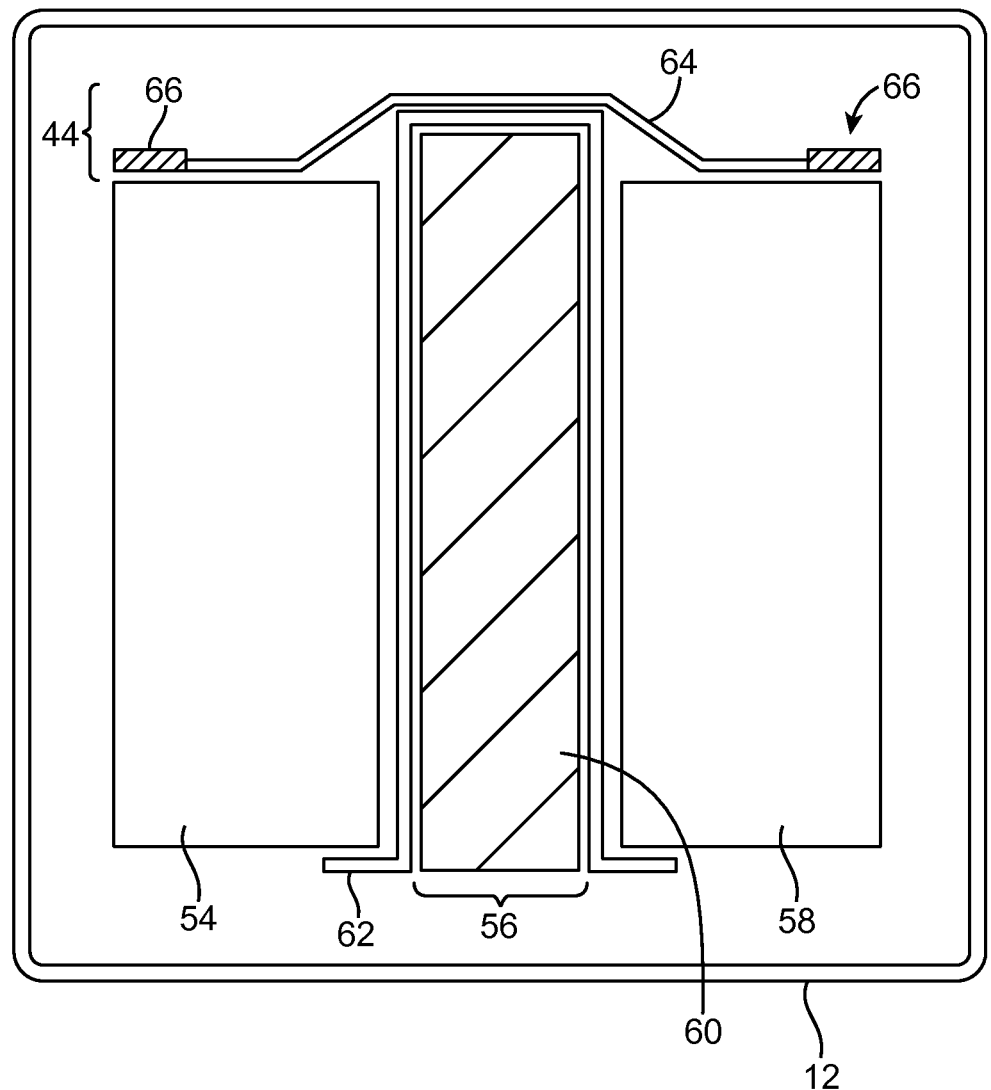
FIG. 4 is a cross-sectional side view of an illustrative electronic device of the type shown in FIG. 1 in accordance with an embodiment of the present invention.

A cross-sectional side view of device 10 of FIG. 1 taken along line 20 of FIG. 1 and viewed in direction 22 is shown in FIG. 4. As shown in FIG. 4, the components of device 10 may be mounted within the interior of device housing 12. Hard disk drive 60 or other storage components may, if desired, be mounted within bracket 62 in region 56. Antenna structures 44 may include antenna ground structure 64 and antenna resonating elements 66. Bracket 62 may be a metal bracket. Antenna ground structures 64 may be formed from a stamped sheet metal part that is mounted to metal bracket 62. Antenna ground structures 64 may be grounded to a source of ground potential by virtue of being electrically shorted to metal bracket 62, which may be grounded.

Antennas in an antenna array for device 10 may be formed by mounting antenna resonating elements 66 within the vicinity of antenna ground structures 64. Antenna ground structures 64 may sometimes be referred to as an antenna can or grounding can or may be referred to as a shared antenna ground in scenarios such as those in which structures 64 form a common ground for each of antenna resonating elements 66. Portions of antenna resonating elements 66 may be shorted to antenna ground structures 64 using solder or other electrical paths.

Antenna resonating elements 66 may be based on patch antenna resonating elements, loop antenna resonating elements, monopole antenna resonating elements, dipole antenna resonating elements, planar inverted-F antenna resonating elements, slot antenna resonating elements, other antenna resonating elements, or combinations of these antenna resonating elements. As an example, antenna resonating elements 66 may be inverted-F antenna resonating elements that are used in forming an array of inverted-F antennas for device 10.

Figure 5:
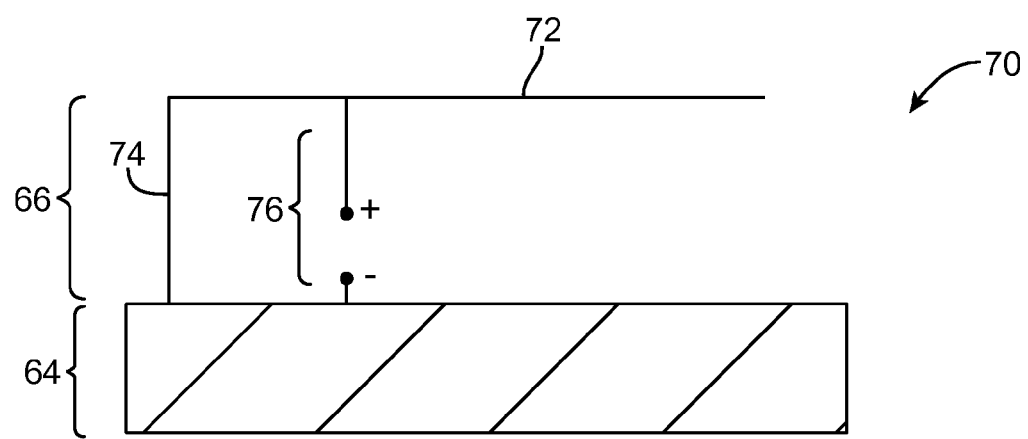
FIG. 5 is a diagram of an illustrative antenna of the type that may be used in forming an antenna array with multiple antennas in a wireless electronic device in accordance with an embodiment of the present invention.

FIG. 5 is a diagram of an illustrative inverted-F antenna 70 formed from inverted-F antenna resonating element 66 and antenna ground 64. Antenna ground 64 may be a stamped metal ground structure such as antenna ground 64 of FIG. 4. Antenna resonating element 66 may be a single arm or multi-arm inverted-F antenna resonating element that is mounted adjacent to antenna ground structures 64 as shown in FIG. 4.

As shown in FIG. 5, antenna resonating element 66 may have a main resonating element arm such as arm 72. Short circuit branch 74 may be coupled between arm 72 and ground 64. Antenna feed branch 76 may be coupled between arm 72 and ground 64 in parallel with short circuit branch 74. Antenna feed branch 76 may form an antenna feed that includes a positive antenna feed terminal (+) and a ground antenna feed terminal (−). A positive transmission line conductor in transmission line structures 42 may be coupled between a positive terminal in radio-frequency transceiver circuitry 40 and positive antenna feed terminal (+). A ground transmission line conductor in transmission line structures 42 may be coupled between a ground terminal in radio-frequency transceiver circuitry 40 and ground antenna feed terminal (−).

Resonating element arm 72 may have a single branch or may have a longer branch that is associated with a low band resonance and a shorter branch that is associated with a high band resonance (as an example). Configurations in which inverted-F antenna has three or more different resonating element branches may also be used. The single-arm configuration of antenna resonating element 66 of FIG. 5 is merely illustrative.

Figure 6:
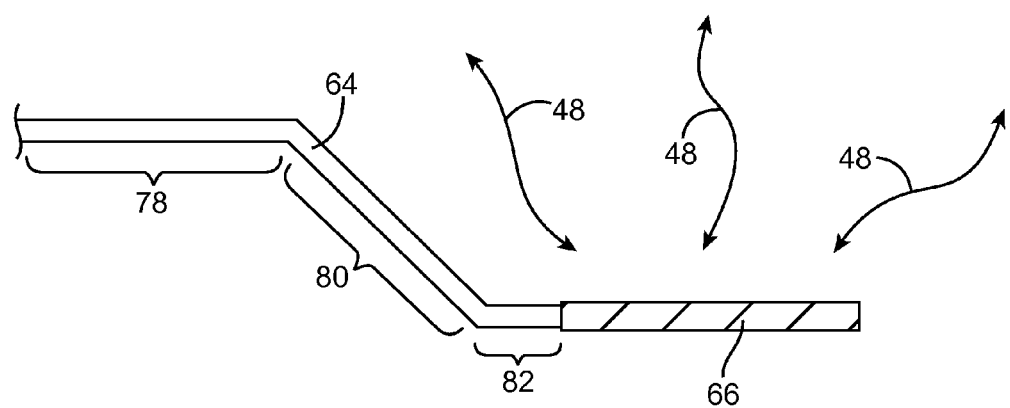
FIG. 6 is a cross-sectional side view of a portion of an antenna ground structure and an associated antenna resonating element being used to form an antenna in a wireless electronic device in accordance with an embodiment of the present invention.

Antenna ground structures 64 may be formed from a stamped sheet metal part that is oriented horizontally, as shown in FIG. 4. To help avoid undesired reflection-induced resonances in wireless performance and thereby improve antenna performance, it may be desirable to form at least some of the surfaces of antenna ground structures 64 with angles (i.e., with slanted surfaces that form diagonal steps between different ground plane regions). As shown in FIG. 6, for example, the sheet metal that is used in forming antenna ground structures 64 may be stamped to form planar horizontal portions such as horizontal portions 78 and 82 and angled portions such as angled portion 80. Angled surfaces 80 may help reduce the possibility of creating undesired standing wave reflections in the antennas of device 10 and may help evenly distribute the signals from the antennas of device 10, improving antenna performance while satisfying regulatory requirements for emitted signal levels.

As shown in FIG. 6, the surfaces of angled (slanted step) portion 80 may be oriented at a 45° angle with respect to horizontal surfaces such as surfaces 78 and 82. Angled surfaces in antenna ground structures 64 may be oriented at other angles (e.g., angles of more than 45° or less than 45°) with respect to horizontal surfaces such as surfaces 78 and 82, if desired. The configuration of FIG. 6 is merely illustrative.

Figure 7:
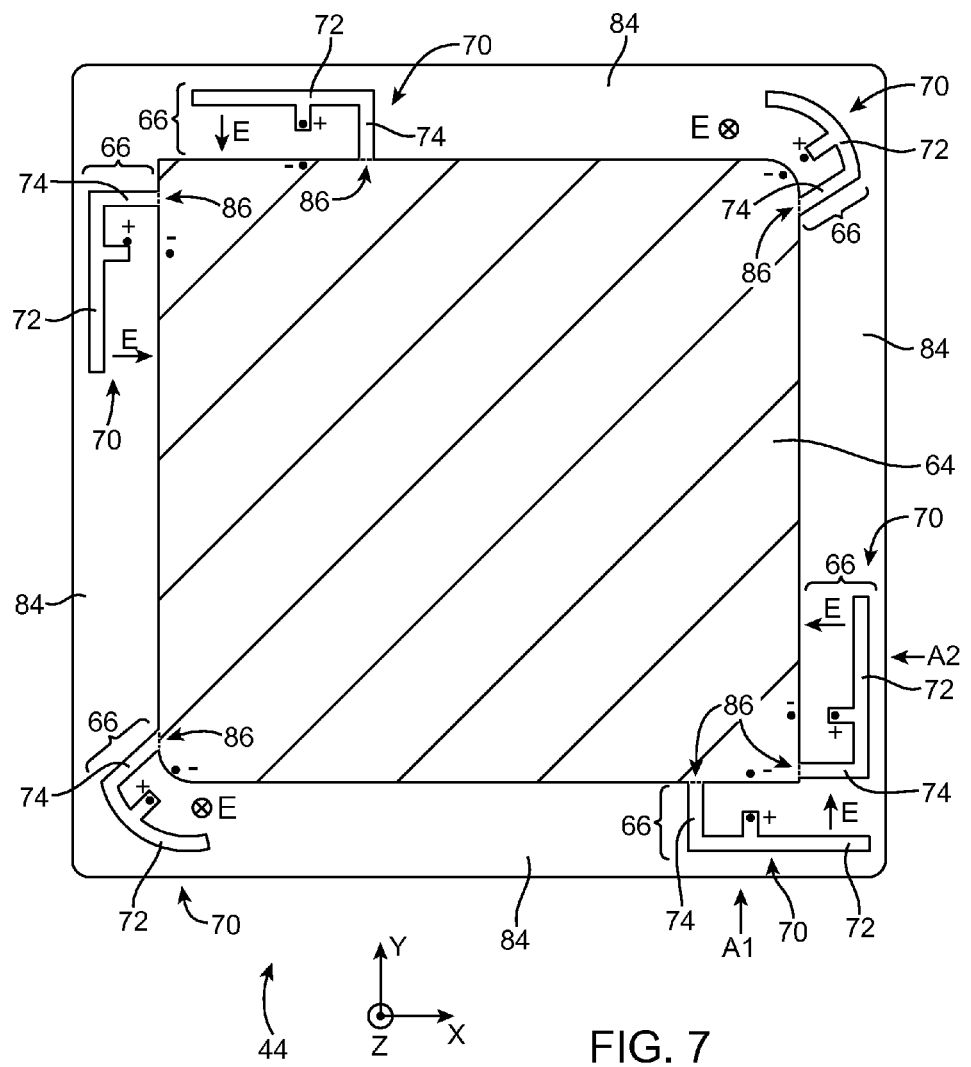
FIG. 7 is a top view of an antenna array formed from an antenna ground plane and an array of antenna resonating elements surrounding the ground plane in accordance with an embodiment of the present invention.

A top view of antenna structures 44 is shown in FIG. 7. As shown in FIG. 7, antenna structures 44 may include antenna ground structures 64 with an approximately rectangular footprint (e.g., a structure with a peripheral edge that outlines an approximately rectangular shape). Multiple antenna resonating elements 66 may be arranged around the periphery of antenna ground structures 64. There may be, for example, an array of six antennas 70 in antenna structures 44. In this type of configuration, three of the antennas may be configured to transmit and receive wireless signals in at least a 2.4 GHz wireless local area network communications band and another three of the antennas may be configured to transmit and receive wireless signals in at least a 5 GHz wireless local area network communications band.

In each antenna 70, short circuit branch 74 may be used to couple main resonating element arm 72 to antenna ground 64. Each antenna has an associated antenna feed formed from positive (+) and ground (−) antenna feed terminals. The positive and ground antenna feed terminals of each antenna feed may be coupled to transmission line structures 42 such as coaxial cables. For example, the antenna feed terminals of each antenna 70 of FIG. 7 may be coupled to a printed circuit board on which components for radio-frequency transceiver circuitry 40 have been mounted using a respective coaxial cable.

Because the inverted-F antenna resonating elements 66 are oriented in different directions in the configuration of FIG. 7, antennas 70 exhibit different polarizations, as indicated by the electric fields E associated with each antenna 70 in FIG. 7. Placement of antennas 70 within antenna structures 44 so that antennas 70 exhibit different polarizations helps improve wireless signal uniformity and reduces electromagnetic coupling between antennas 70, thereby improving performance of the antenna array (e.g., when handling MIMO signals). Electromagnetic coupling can also be reduced by ensuring that adjacent antennas such as antennas A1 and A2 operate in different bands.

The center of antenna structures 44 may be formed from a metal sheet with an approximately rectangular outline (i.e., antenna ground 64). Dielectric support structure 84 may surround the periphery of antenna ground 64. For example, dielectric support structures 84 may have the shape of a strip of dielectric material that runs along the edges of antenna ground 64, so that the strip of dielectric material forms a ring-shaped dielectric member. Adhesive, fasteners, solder, overmolding, engagement features, or other attachment mechanisms may be used in attaching dielectric support structures 84 to antenna ground structures 64. Because dielectric support structures 84 may be used in supporting antenna resonating elements 66 for antennas 70, dielectric support structures 84 are sometimes referred to as dielectric carriers, a dielectric support member, an antenna support structure, an antenna support, or an antenna resonating element support member (as examples).

Antenna resonating elements 66 may be formed using conductive structures such as patterned metal foil or metal traces on a dielectric substrate. Metal traces may be patterned using selective laser surface activation followed by electroplating (sometimes referred to as laser direct structuring), by blanket metal deposition using physical vapor deposition equipment or electrochemical deposition followed by photolithographic patterning, by screen printing, etc. The conductive structures of antenna structures 66 may be supported by glass ceramic carriers, plastic carriers, printed circuits, or other dielectric support structures such as dielectric support structures 84. Conductive materials for antenna resonating elements 66 may, for example, be supported on dielectric supports 84 such as injection-molded plastic carriers, glass or ceramic members, or other insulators.

In a configuration in which antenna resonating elements are formed from metal traces on dielectric support structure 84 and in which antenna ground 64 is formed from a stamped sheet metal structure, solder may be used in forming electrical connections 86 between antenna resonating elements 66 and antenna ground.

The arrangement of antenna structures 44 as shown in FIG. 7 is merely illustrative and does not serve to limit the scope of the present invention. If desired, device 10 may include less than six or more than six antennas formed along the periphery of device 10 for supporting communications in any suitable number of radio-frequency bands. The antennas need not be formed in upper portion 16 of device 10. It should be appreciated that antenna structures 44 may be formed near a lower base portion of device 10 or somewhere in device 10 between upper portion 16 and the lower base portion.

As described above, electronic devices such as device 10 may include structures such as antennas, printed circuit boards, connectors, heat sinks, fans, power supply circuitry, and other components that are mounted within the housing of electronic device 10. Structures such as these may be assembled using automated manufacturing tools. Examples of automated manufacturing tools include automated milling machines, robotic pick-and-place tools for populating printed circuit boards with connectors and integrated circuits, computer-controlled tools for attaching connectors to each other, and automated welding machines (as examples). Manual assembly techniques may also be used in assembling electronic devices. For example, assembly personnel may attach a pair of mating connectors to each other by pressing the connectors together.

Regardless of whether operations such as these are performed using automated tools or manually, there will generally be a potential for error. Parts may not be manufactured properly and faults may arise during assembly operations.

With conventional testing arrangements, these faults may sometimes be detected after final assembly operations are complete. For example, over-the-air wireless tests on a fully assembled device 10 may reveal that one of the antennas in device 10 is not performing within desired limits. This type of fault may be due to improper connection of a pair of connectors in the signal path between the defective antenna and radio-frequency transceiver 40. Detection of faults at late stages in the assembly process may, however, result in the need for extensive reworking. It may often be impractical to determine the nature of the fault, forcing the device to be scrapped.

Figure 8:
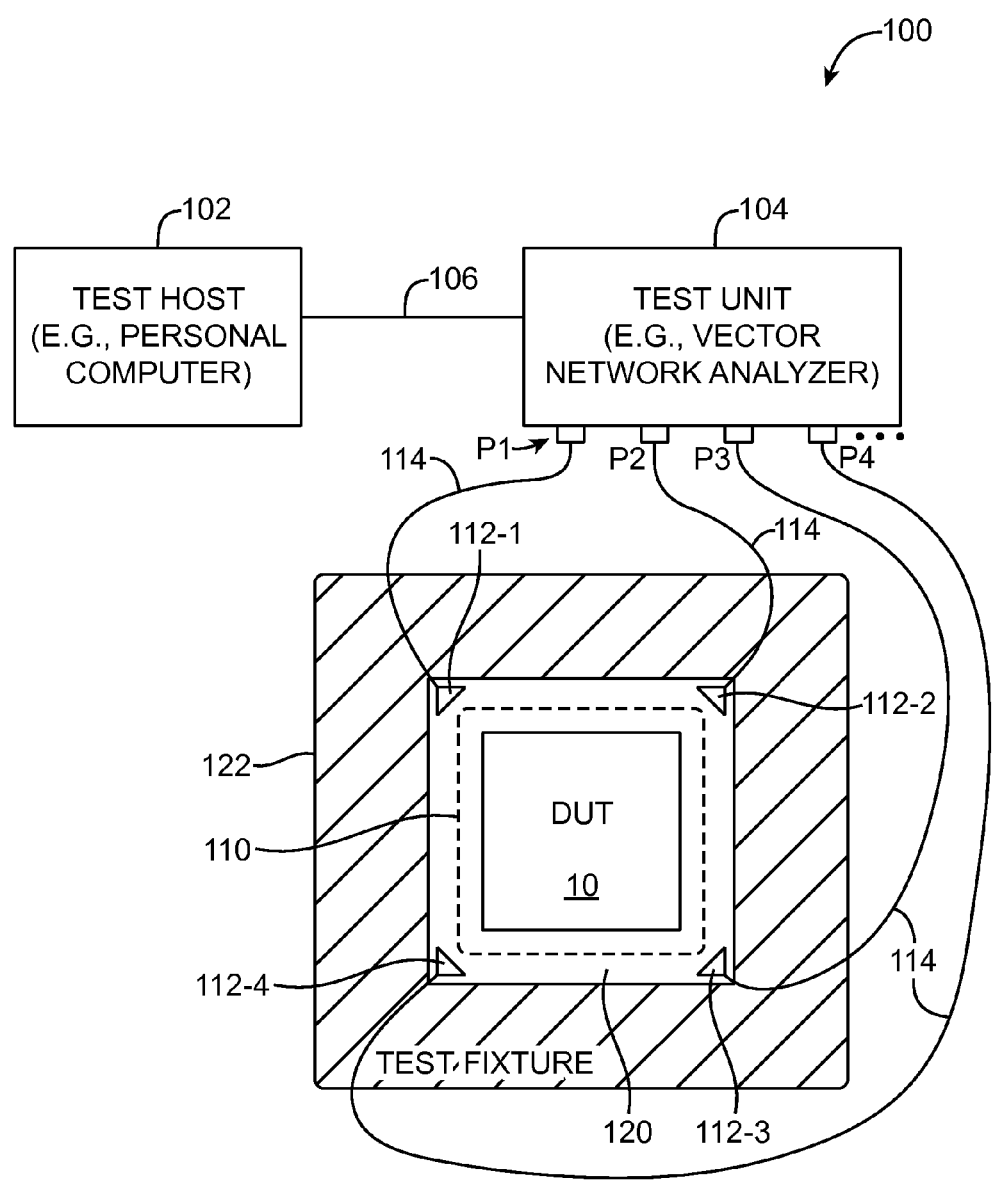
FIG. 8 a diagram of an illustrative test system for testing an electronic device with an antenna array of the type shown in FIG. 7 in accordance with an embodiment of the present invention.

Earlier and potentially more revealing and accurate tests may be performed by using wireless probe structures to test partially assembled electronic device structures via electromagnetic coupling mechanisms. An illustrative test system such as test system 100 with wireless (or electromagnetic coupling) probes for use in testing electronic device structures 10 is shown in FIG. 8. Device 10 that is fully assembled or partially assembled and that is tested by test system 100 may sometimes be referred to as device structures under test or as a device under test (DUT).

As an example, test system 100 may be used to test a partially assembled production DUT 10 after bracket 62 has been assembled within housing 12 (e.g., antenna ground structures 64 may be attached to metal bracket 62) and after transmission line paths 42 have been connected between antenna structures 44 and radio-frequency transceiver circuitry 40 mounted on board 59. In some arrangements, transmission line paths 42 include coaxial cables having radio-frequency (RF) connectors that are mated with corresponding terminals on board 59 and with terminals that are connected to the different antenna feed terminals associated with antenna structures 44.

During assembly of metal bracket 62 to ground structures 64, it is possible that antenna structures 44 be mechanically damaged or that the connections to antenna structures 44 be electrically broken (e.g., the radio-frequency antenna connectors may be inadvertently unplugged during assembly). Test system 100 may therefore be used to perform electromagnetic coupling based testing on partially assembled DUT 10 to detect such types of manufacturing and assembly defects at an early production stage. Testing DUT 10 using electromagnetic coupling (wireless) techniques in this way can help reduce the risk of cosmetic damages to the production DUT during testing. DUT 10 need not be powered on during testing. Testing in which the device structures under test can be deactivated is sometimes referred to as "passive" testing, passive antenna testing, or passive wireless testing.

Referring back to FIG. 8, test system 100 may include a test host such as test host 102, a test unit such as test unit 104, a test fixture such as test fixture 110, control circuitry, network circuitry, cabling, and other test equipment. DUT 10 may be mounted on test fixture 110 during testing. Test fixture 110 may be formed from plastic support structures, a rigid printed circuit board substrate such as a fiberglass-filled epoxy substrate (e.g., FR4), a flexible printed circuit ("flex circuit") formed from a sheet of polyimide or other flexible polymer, or other dielectric material to avoid interference with radio-frequency test measurements.

Radio-frequency test unit (sometimes referred to as an RF tester) 104 may be a vector network analyzer (as an example). In the example of FIG. 8, test unit 104 may have four RF ports P1, P2, P3, and P4 through which radio-frequency test signals may be transmitted and received during testing. Ports P1, P2, P3, and P4 may be respectively coupled to test probes 112-1, 112-2, 112-3, and 112-4 via different cables 114. Cables 114 may be coaxial cables (as an example). Test probes 112 (i.e., test probes 112-1, 112-2, 112-3, and 112-4) may serve as test antennas that can be used to emit and receive radio-frequency test signals. In general, antenna probes 112 referred to herein as test antennas or probe antennas, may be implemented using any suitable antenna type (e.g., loop antennas, patch antennas, dipole antennas, monopole antennas, inverted-F antennas, planar inverted-F antennas, coil antennas, open-ended waveguides, horn antennas, etc.).

During testing, antenna probes 112 may be placed in the vicinity of DUT 10. For example, antenna probes 112 may be placed within 10 cm or less of DUT 10, within 2 cm or less of DUT 10, or within 1 cm or less of DUT 10 (as examples). These distances may be sufficiently small to place antenna probes 112 within the "near field" of device structures under test 104 (i.e., a location at which signals are received by an antenna that is located within about one or two wavelengths from device structures under test 10 or less).

Test probes 112 may be formed as an integral part of test fixture 110 and may be arranged on fixture 110 such that test probes 112 are positioned along the periphery of DUT 10 during testing. A test wave guide structure or region 120 may be formed on test fixture 110 such that when DUT is mounted on test fixture 110, test signals that are wirelessly transmitted from test probes 112 travel through wave guide structure 120 along the periphery of DUT 10, as indicated by dotted signal path 122. Configured in this way, the radio-frequency test signals propagating through wave guide structure 120 are affected by the presence of antenna structures 44 within DUT 10.

Radio-frequency tester 104 may receive commands from test host 102 via path 106 that direct tester 104 to gather desired radio-frequency measurements. If desired, test data can be provided from tester 104 to test host 102 via path 106.

For example, tester 104 may direct radio-frequency tester 104 to produce radio-frequency test signals that are applied to DUT 10 via antenna test probes 112. Radio-frequency transceiver circuitry 40 in DUT 10 need not be active during testing of DUT 10. Even without receiving active radio-frequency signals from transceiver 40, antenna structures 44 in DUT 10 may emit radio-frequency signals when being energized by the test signals generated by tester 104. Antenna probes 112 may be used to transmit radio-frequency signals to DUT 10 and may be used to receive corresponding radio-frequency signals that have been affected by the presence of antenna structures 44 in DUT 10.

The transmitted and received signals may be processed to compute scattering parameter test data (S-parameter measurements) including complex impedance or reflection coefficient data, complex forward transfer coefficient data, or other suitable data for determining whether DUT 10 contains some defect.

In the example of FIG. 8 in which there are four RF ports, up to 16 different possible 4-port scattering parameter measurements (e.g., S11, S12, S13, S14, S21, S22, ..., S43, and S44) can be gathered if each of the four antenna probes 112 is used to transmit and receive wireless test signals. This is merely illustrative. If desired, only a subset of all the different possible measurements can be taken to reduce test time. For example in some scenarios, only some of the S-parameter measurements are actually "sensitive" to the presence of manufacturing defects (e.g., only the more sensitive measurements need to be taken). In other arrangements, test system 100 may include, more than two, more than three, or more than four wireless test probes positioned in the vicinity of the periphery of DUT 10 during testing.

Figure 9:
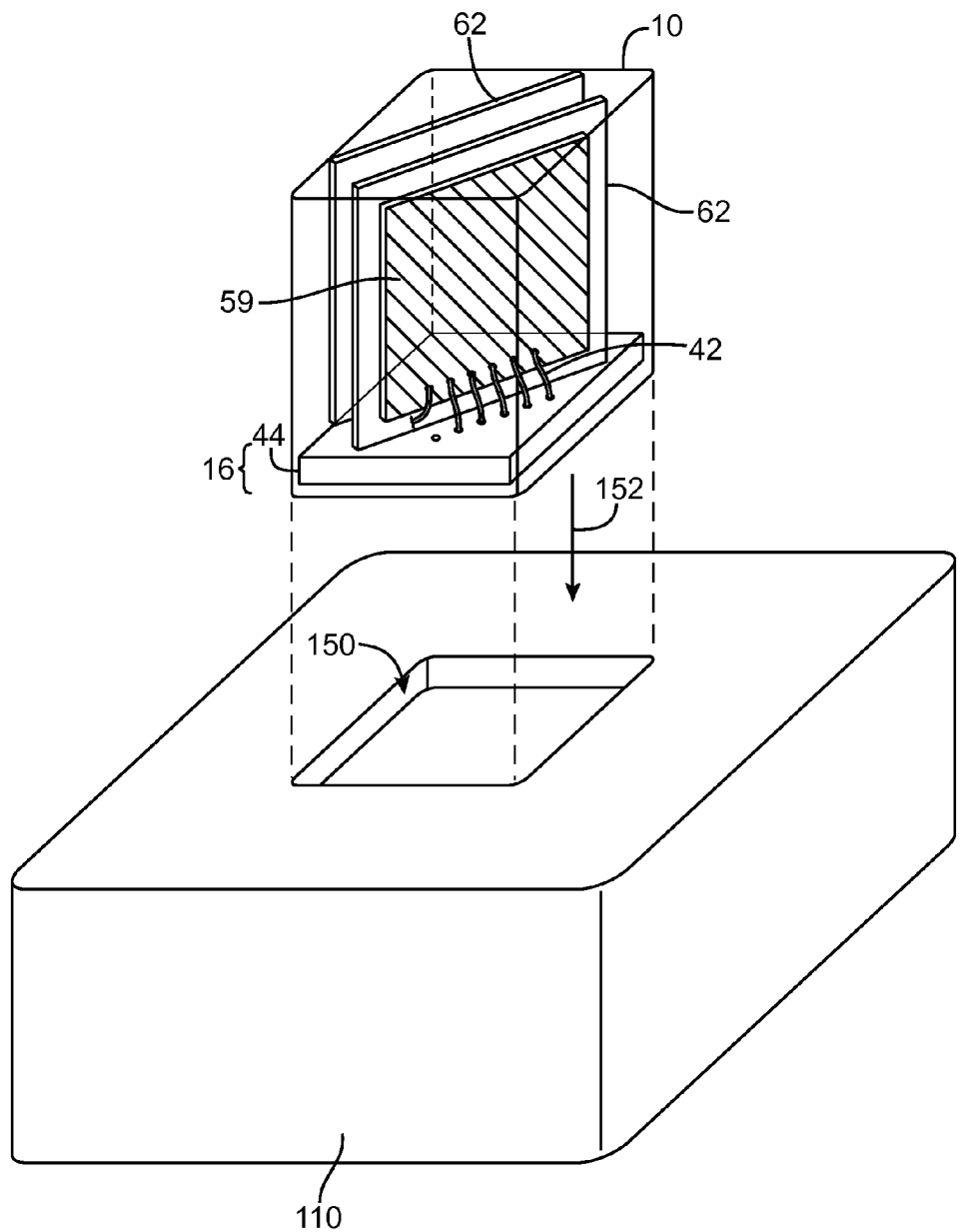
FIG. 9 is a perspective view of an illustrative test fixture having a recess for receiving an electronic device under test in accordance with an embodiment of the present invention.

FIG. 9 shows a perspective view of test fixture 110. Test fixture 110 may include a recess such as recess 150 for receiving DUT 10 during testing. The insertion of DUT 10 within recess 150 ensures that DUT 10 is positioned at a desired predetermined location relative to antenna probes 112 during testing. The antenna test probes may be formed within recess 150 (as an example). Text fixture 110 may serve as a dielectric standoff that separates DUT 10 away from other potentially interfering objects during testing.

As shown in FIG. 9, DUT 10 may be inserted into test fixture 110 with the upper antenna portion 16 facing downwards toward test fixture 110 (e.g., DUT 10 may be positioned in an upside-down orientation during testing).

Arranged in this way, antenna structures 44 are placed closer to the antenna test probes formed within recess 150 than if DUT 10 had been mounted in an upright orientation on test fixture 110. In the example of FIG. 9, components on main logic board 59 are connected to antenna structures 44 via cable paths 42. In this particular example, one of the cable paths 42 is inadvertently disconnected/unplugged. Test system 100 can be used to detect such types of errors. This is merely illustrative. In general, test system 100 may be used to detect any type of faults associated with antenna structures 44 in DUT 10.

To determine necessary testing criteria, test system 100 may first be used to gather baseline test data from reference devices with no manufacturing/assembly defects. Thereafter when testing a particular production DUT 10, test data gathered from that DUT 10 can then be compared to the baseline reference data. If the difference between the currently gathered test data and the baseline reference data is less than a predetermined threshold, the DUT may be indicated as a "passing" DUT. If the difference between the currently gathered test data and the baseline reference data is greater than the predetermined threshold, the DUT may be marked as a "failing" DUT (e.g., a DUT with at least some manufacture/assembly defect).

Figure 10:
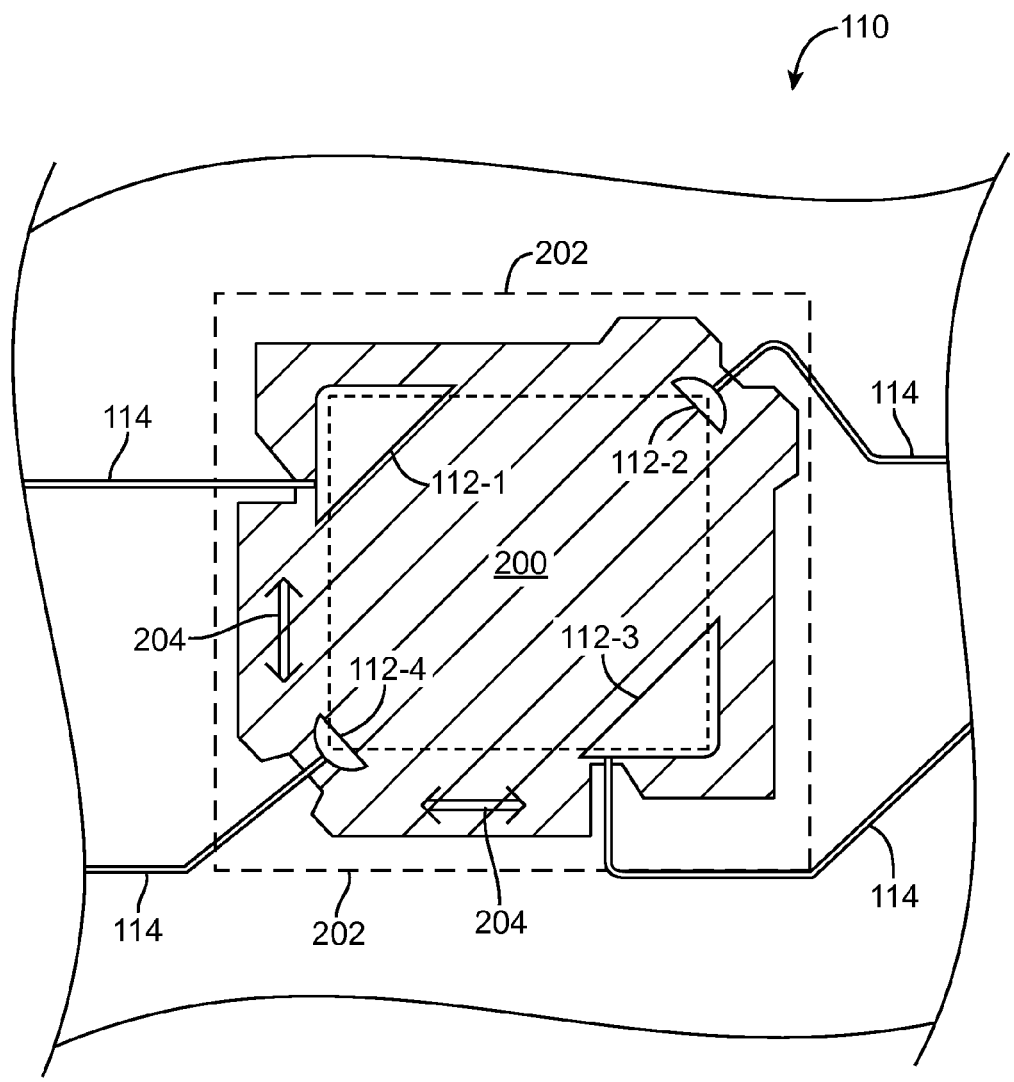
FIG. 10 is a top view showing illustrative test probes that are included in a test system of the type shown in FIG. 8 in accordance with an embodiment of the present invention.

FIG. 10 is a top view of test fixture 110 illustrating the formation of test probes 112. In the diagram of FIG. 10, areas on test fixture 110 other than shaded non-conducting region 200 may be covered with conductive material (e.g., a layer of copper, aluminum, silver, gold, nickel, a mixture of these metals, or other suitable conducting material). The four conductive "islands" in dielectric region 200 may serve as the antenna probes 112. In the example of FIG. 10, antenna probes 112-1 and 112-3 may be physically larger than antenna probes 112-2 and 112-4. When DUT 10 is mounted over region 200, antenna probe 112-1 may be placed in the vicinity of the two device antennas 70 in the top left portion as viewed from the top of device 10 (see, FIG. 7), whereas antenna probe 112-3 may be placed in the vicinity of the two device antennas 70 in the lower right portion as viewed from the top of device 10. On the other hand, antenna probe 112-2 may be placed in the vicinity of the device antenna 70 in the top right portion of device 10, whereas antenna probe 112-4 may be placed in the vicinity of the device antenna 70 in the lower left portion of device 10. In other words, test probes 112-1 and 112-3 are bigger because they are each placed next to two of the device antennas, whereas test probes 112-2 and 112-4 are relatively smaller because they are each placed next to only one of the device antennas during testing. This is merely illustrative. If desired, test probes 112 may be formed to exhibit any suitable size and shape.

When DUT 10 is inserted within recess 150 of test fixture 110, DUT 10 may cover a portion of region 200. The region such as region 202 formed between the periphery of DUT 10 and the edge of non-conducting region 200 may serve as a test waveguide structure 202 through which test signals can be conveyed during testing. Radio-frequency test signals generated by tester 104 may propagate along the periphery of DUT 10 via waveguide region 202, as indicated by arrows 204. In general, waveguide region 202 should run along the periphery of DUT 10 and should overlap with at least some of the six antennas in DUT 10 while DUT 10 is placed in the test fixture. Propagating test signals along the periphery of DUT 10 in this way may be suitable for testing devices having multiple antennas formed along its periphery (such as the antenna array of FIG. 7).

Figure 11A:
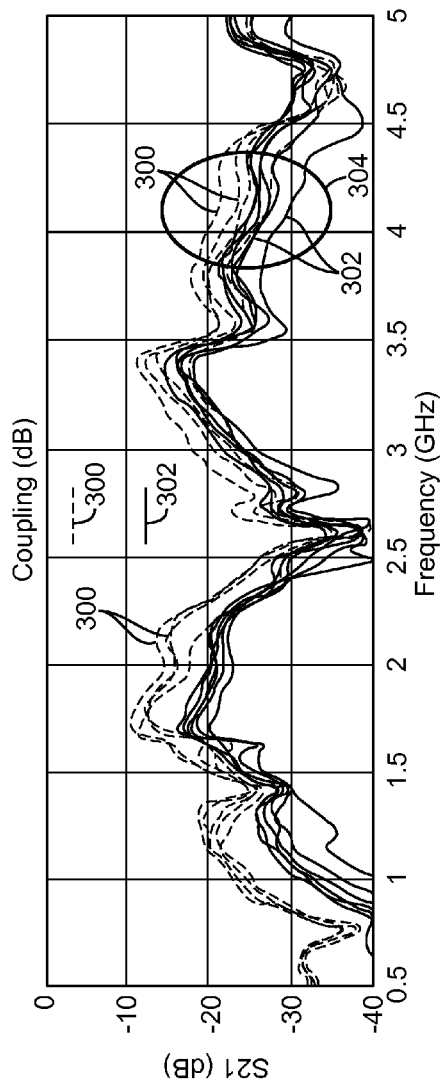
FIGS. 11A and 11B show graphs in which forward transfer coefficient magnitude and phase data that has been gathered using a test system of the type shown in FIG. 8 has been plotted as a function of applied signal frequency in accordance with an embodiment of the present invention.
Figure 11B:
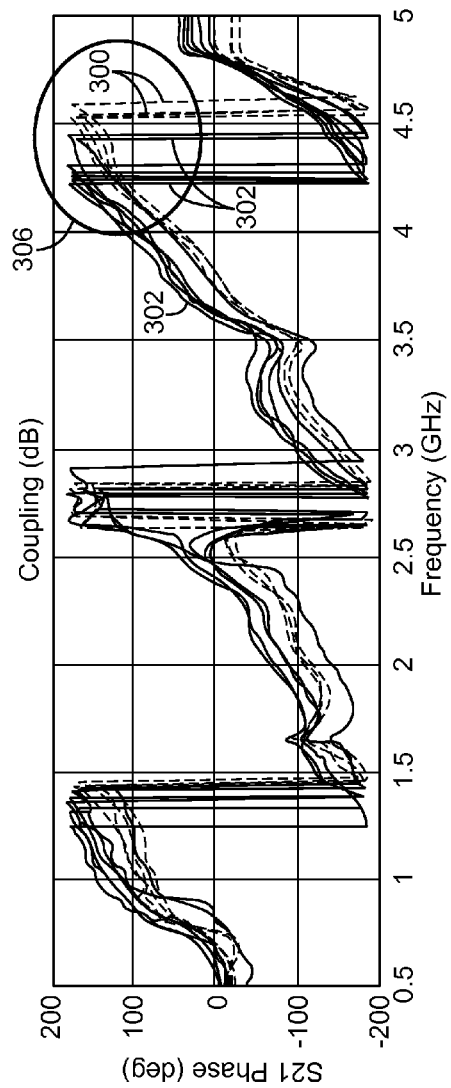

Illustrative test data gathered using test system 100 is shown in FIGS. 11A and 11B. In FIG. 11A, the magnitude of forward transfer coefficient S21 has been plotted as a function of test signal frequency for a frequency range of 0 to 5 GHz. In FIG. 11B, the phase of forward transfer coefficient S21 has been plotted as a function of test signal frequency for a frequency range of 0 to 5 GHz. There are two sets of curves in the graphs of FIGS. 11A and 11B. Curves 300 correspond to baseline data measured from reference devices without any manufacturing defects, whereas curves 302 correspond to test data measured from DUTs 10 with manufacturing defects. As indicated by illustrative frequency ranges 304 and 306 (e.g., about 3.5 to 5 GHz) in FIGS. 11A and 11B, respectively, curves 302 exhibit more variation than curves 300. The presence of manufacturing defects may therefore be detected by monitoring the amount that measurements from a particular DUT deviate from the baseline reference data. Other frequency ranges may be investigated if desired (e.g. a range of frequencies covering 1 to 5 GHz, a range of frequencies including frequencies between 2 and 4 GHz, etc.).

Figure 12:
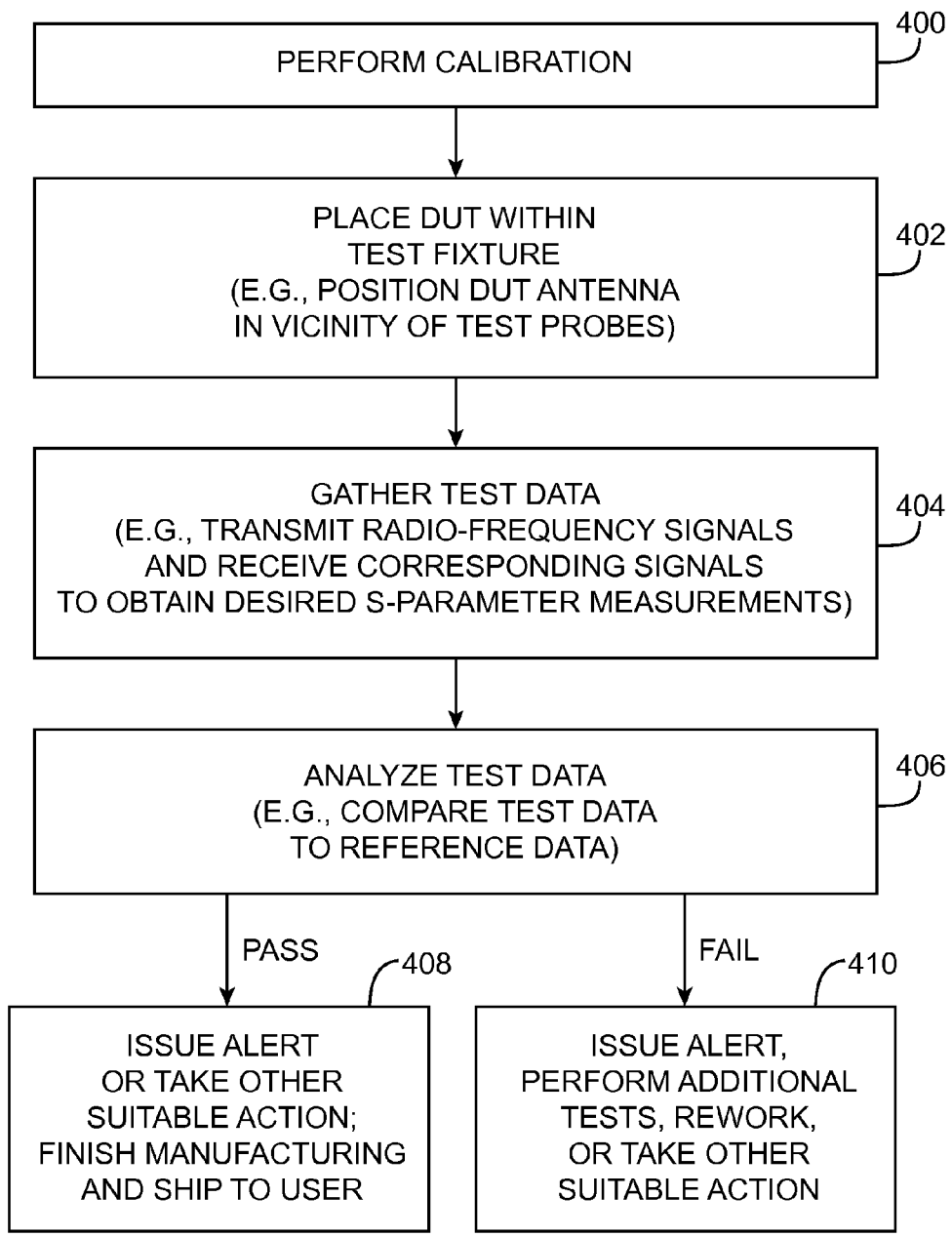
FIG. 12 is a flow chart of illustrative steps for operating the test system of FIG. 8 to test an electronic device of the type shown in FIGS. 1-7 in accordance with an embodiment of the present invention.

Illustrative steps involved in operating test system 100 to test DUT 10 are shown in FIG. 12.

At step 400, calibration operations may be performed on properly manufactured and assembled devices 10. In particular, antenna probes 112 may be used to transmit and receive radio-frequency signals in a desired frequency range (e.g., from 0 Hz to 3 GHz, from 3-14 GHz, a subset of one of these frequency ranges, or another suitable frequency range). Signals corresponding to the transmitted signals may be received from the device structures under test and processed with the transmitted signals to obtain scattering parameter measurements or other suitable test data. The scattering parameter measurements or other test measurements that are made on the properly manufactured and assembled device structures may be stored in storage on tester 104 or test host 102 (e.g., in storage on a vector network analyzer, in storage on computing equipment such as a computer or network of computers that are associated with the vector network analyzer, etc.). If desired, the device structures that are tested during the calibration operations of step 400 may be "limit samples" (i.e., structures that have parameters on the edge or limit of the characteristic being tested. Device structures of this type are marginally acceptable and can therefore be used in establishing limits on acceptable device performance during calibration operations.

At step 402, a given production DUT 10 that potentially includes a manufacturing/assembly defect is placed within test fixture 110 of test system 100 (e.g., DUT 10 may be inserted upside-down within recess 150 of test fixture 110). Inserted in this way, antenna structures 44 may be brought into the vicinity of the various antenna test probes 112 in test system 100.

At step 404, test data may be gathered by using antenna probes 112 to receive corresponding RF test signals. For example, antenna probes 112 may be used to transmit and receive radio-frequency test signals in a desired frequency range (e.g., from 0 Hz to 3 GHz, 3 GHz to 14 GHz, or other suitable frequency range, preferably matching the frequency range used in obtaining the calibration measurements of step 400). Wireless test data such as scattering parameter measurements or other suitable test data may be gathered. The scattering parameter measurements (phase and magnitude measurements for impedance and forward transfer coefficient) may be stored in storage in tester 104 or test host 102.

At step 406, the radio-frequency test data may be analyzed. For example, the test data that was gathered during the operations of step 404 may be compared to the baseline (calibration) data obtained during the operations of step 400 (e.g., by calculating the difference between these sets of data and determining whether the calculated difference exceeds predetermined threshold amounts, by comparing test data to the calibration data from limit samples that represents limits on acceptable device structure performance, or by otherwise determining whether the test data deviates by more than a desired amount from acceptable data values).

After computing the difference between the test data and the calibration data at one or more frequencies to determine whether the difference exceeds predetermined threshold values, appropriate actions may be taken. For example, if the test data and the calibration data differ by more than a predetermined amount, test host 102 may conclude that DUT 10 contains a fault and appropriate actions may be taken at step 410 (e.g., by issuing an alert, by informing an operator that additional testing is required, by displaying information instructing an operator to rework or scrap the device structures, etc.). If desired, visible messages may be displayed for an operator of system 100 at step 410 using some sort of display. In response to a determination that the test data and the calibration data differ by less than the predetermined amount, test host 102 may conclude that DUT 10 has been manufactured and assembled properly and appropriate actions may be taken at step 408 (e.g., by issuing an alert that the partially assembled DUT 10 has passed testing, by completing the assembly of the structures to form a finished electronic device, by shipping the final assembled electronic device to a customer, etc.). If desired, visible messages may be displayed for an operator of system 100 at step 480.

The foregoing is merely illustrative of the principles of this invention and various modifications can be made by those skilled in the art without departing from the scope and spirit of the invention. The foregoing embodiments may be implemented individually or in any combination.

What is claimed is:

1. A method for using a test system to test a device under test having a periphery and an array of antennas formed along its periphery, wherein the test system includes a test fixture and a test unit, the method comprising:
    forming a test waveguide structure along the periphery of the device under test by placing the device under test in the test fixture; and
    while the device under test is placed in the test fixture, generating radio-frequency test signals with the test unit and passing the radio-frequency test signals through the test waveguide structure.

2. The method defined in claim 1, wherein the array of antennas in the device under test includes more than three antennas formed along the periphery of the device under test, and wherein the test waveguide guide structure overlaps with at least some of the three antennas while the device under test is placed in the test fixture.

3. The method defined in claim 1, wherein the device under test is operable in a upright orientation during normal operation, and wherein placing the device under test in the test fixture comprises placing the device under test in the test fixture in an upside-down orientation that is different than the upright orientation.

4. The method defined in claim 1, wherein placing the device under test in the test fixture comprises inserting the device under test in a recess in the test fixture to secure the device under test in a desired position.

5. The method defined in claim 1, further comprising:
    with antenna test probes arranged along the test waveguide structure, gathering radio-frequency measurements by transmitting the radio-frequency test signals generated by the test unit and receiving corresponding signals that have been passed through at least a portion of the test waveguide structure.

6. The method defined in claim 5, further comprising:
    obtaining scattering parameter measurements by analyzing the transmitted radio-frequency test signals and the corresponding received radio-frequency test signals.

7. The method defined in claim 6, further comprising:
    determining whether the device under test contains a manufacturing defect by comparing the scattering parameter measurements to predetermined threshold levels.

8. A method of using a test system to test a partially assembled device having a periphery, comprising:
    placing the partially assembled device on a test fixture; and
    with a plurality of test probes that is formed on the test fixture and that is arranged along the periphery of the partially assembled device when the partially assembled device is placed on the test fixture, transmitting and receiving wireless test signals while the partially assembled device is powered off.

9. The method defined in claim 8, further comprising:
    obtaining scattering parameter measurements by analyzing the transmitted and received wireless test signals.

10. The method defined in claim 9, wherein obtaining the scattering parameter measurements comprises obtaining 4-port scattering parameter measurements.

11. The method defined in claim 9, further comprising:
    calibrating a reference device to obtain baseline test data.

12. The method defined in claim 11, further comprising:
    with a test host, determining whether the partially assembled device contains manufacturing defects by comparing the scattering parameter measurements gathered from the partially assembled device to the baseline test data.

13. The method defined in claim 12, wherein the partially assembled device includes antenna structures that are coupled to radio-frequency transceiver circuitry via transmission line paths, and wherein determining whether the partially assembled device contains manufacturing defects comprises determining whether at least one of the transmission line paths interposed between the antenna structures and the radio-frequency transceiver circuitry in the partially assembled device is broken.

14. The method defined in claim 11, wherein the partially assembled device includes antenna resonating structures formed along its periphery, the method further comprising:
    conveying the wireless test signals via a waveguide structure that is formed on the test fixture, wherein the waveguide structure runs along the periphery of the partially assembled device, and wherein the waveguide structure overlaps with at least some of the antenna resonating structures in the partially assembled device.

15. Test apparatus, comprising:
    a test unit for generating radio-frequency test signals;
    a test fixture for receiving a device under test having a periphery; and
    a plurality of antenna probes arranged on the test fixture, wherein the plurality of antenna probes is positioned along the periphery of the device under test when the device under test is received within the test fixture.

16. The test apparatus defined in claim 15, wherein the test unit comprises a vector network analyzer.

17. The test apparatus defined in claim 15, wherein the plurality of antenna probes comprises four wireless test probes arranged at corners of the periphery of the device under test when the device under test is received within the test fixture.

18. The test apparatus defined in claim 17, wherein the four wireless test probes comprises a first pair of antenna test probes having a first size and a second pair of antenna test probes having a second size that is different than the first size.

19. The test apparatus defined in claim 15, wherein the device under test includes a number of device antennas formed along its periphery, and wherein the test apparatus includes more antenna probes than the number of device antennas in the device under test.

20. The test apparatus defined in claim 15, further comprising:
  a non-conductive region formed on the test fixture, wherein a portion of the non-conductive region serves as a waveguide structure through which the radio-frequency test signals travel around the periphery of the device under test when the device under test is received within the test fixture.

* * * * *